UNITED STATES PATENT OFFICE.

JOHN D. PENNOCK, OF SYRACUSE, NEW YORK, ASSIGNOR TO THE SOLVAY PROCESS COMPANY, A CORPORATION OF NEW YORK.

METHOD OF MAKING SODIUM SULFATE.

No. 922,031.   Specification of Letters Patent.   Patented May 18, 1909.

Application filed May 25, 1906. Serial No. 318,605.

*To all whom it may concern:*

Be it known that I, JOHN D. PENNOCK, a citizen of the United States, residing at Syracuse, in the county of Onondaga and State of New York, have invented a new and useful Method of Making Sodium Sulfate, of which the following is a specification.

This invention relates to the manufacture of sodium sulfate.

The object of the invention is to provide an economical and effective method of converting commercial niter cake, or acid sodium sulfate, $HNaSO_4$, into sodium sulfate. As is well known, acid sodium sulfate is produced in large quantities in the form of niter cake in the manufacture of nitric acid and is at the present time substantially a waste product. It has heretofore been proposed to convert this into sodium sulfate by various methods, none of which have proven sufficiently advantageous to insure general adoption.

According to this process the niter cake, commonly containing the equivalent of about 36 per cent. of free sulfuric acid, is mixed with a suitable sodium compound having an alkaline reaction, as sodium hydrate or carbonate, or with a mixture containing the same. The sodium compound should be used in substantially the theoretical proportion required to neutralize the sulfuric acid present, and the mixture should be intimate, this being preferably effected by grinding the materials together. To the mixture so prepared the minimum quantity of water which will suffice to thoroughly moisten it and to effect a complete reaction between the acid and alkaline components is added and thoroughly incorporated.

I prefer to proceed substantially as follows:—Commercial niter cake containing about 90 per cent. of acid sodium sulfate and 9 per cent. of normal sodium sulfate is ground with soda ash, the proportions being approximately 1000 pounds niter cake to 398 pounds soda ash. The resulting intimate mixture is moistened and thoroughly stirred, preferably in a suitable mechanical stirrer, until the reaction is complete, when it is dried. The amount of water required will generally be 18 to 20 per cent. by weight.

Instead of soda ash as above described, I may use for neutralizing the acid sulfate the product known in the art as "fished salts" and consisting substantially of a hydrated mixture of sodium hydroxid, carbonate and sulfate in proportions approximately as shown by the following analysis:

| | |
|---|---|
| $H_2O$ | 18.75% |
| $NaOH$ | 11.68 |
| $Na_2CO_3$ | 46.21 |
| $Na_2SO_4$ | 18.87 |
| $NaCl$ | .46 |

In this case both the sodium hydroxid and carbonate neutralize the sulfuric acid with production of sodium sulfate. On account of the high percentage of sulfate in fished salts a much larger proportion must be employed than in the case of soda ash, viz., 640 pounds fished salts to each 1000 pounds niter cake.

The method as above described presents decided advantages in that the quantity of water added is the minimum quantity capable of giving reacting conditions, from which it follows that the expense of evaporation is reduced to the practicable minimum. The necessary reaction between the acid and alkaline components of the mixture may also be brought about by subjecting the same to a temperature above one hundred and twenty-five degrees centigrade. It is thought however, that a more efficient reaction is effected by moistening the mixture, since the free acid thereby becomes very active and consequently attacks the carbonate of soda more readily.

What I claim is:—

1. The method of making sodium sulfate, which consists in mixing niter cake and a sodium compound, having an alkaline reaction, in approximately reacting proportions, then effecting a reaction between the acid and alkaline components and recovering the resulting sodium sulfate.

2. The method of making sodium sulfate which consists in mixing niter cake and a sodium compound capable of neutralizing the same in approximately reacting proportions, then moistening the mixture and thereby effecting reaction in presence of undissolved salts, and drying and recovering the resulting sodium sulfate, substantially as described.

3. The method of making sodium sulfate, which consists in mixing niter cake and a sodium compound capable of neutralizing the same in approximately reacting proportions, then adding the minimum quantity of water capable of giving reacting conditions, and drying and recovering the resulting sodium sulfate, substantially as described.

4. The method of making sodium sulfate, which consists in mixing niter cake and a sodium compound capable of neutralizing the same in approximately reacting proportions, then adding the minimum quantity of water capable of giving reacting conditions, stirring the mixture until reaction is complete, and drying and recovering the resulting sodium sulfate, substantially as described.

5. The method of making sodium sulfate, which consists in mixing niter cake and fished salts in approximately reacting proportions, then adding water and thereby effecting reaction in presence of undissolved salts, and drying and recovering the resulting sodium sulfate, substantially as described.

JOHN D. PENNOCK.

Witnesses:
ROBT. CROASDALE,
EUGENE E. YOUNG.